Dec. 25, 1923.

G. R. GEHRANDT

TRACTOR

Filed Dec. 1, 1919

Witness:
Dar. L. Magnuson.

Inventor:
Gustav R Gehrandt
Jones Bain & Hinkle
Atty.

Dec. 25, 1923. 1,478,824
G. R. GEHRANDT
TRACTOR
Filed Dec. 1, 1919 3 Sheets-Sheet 2
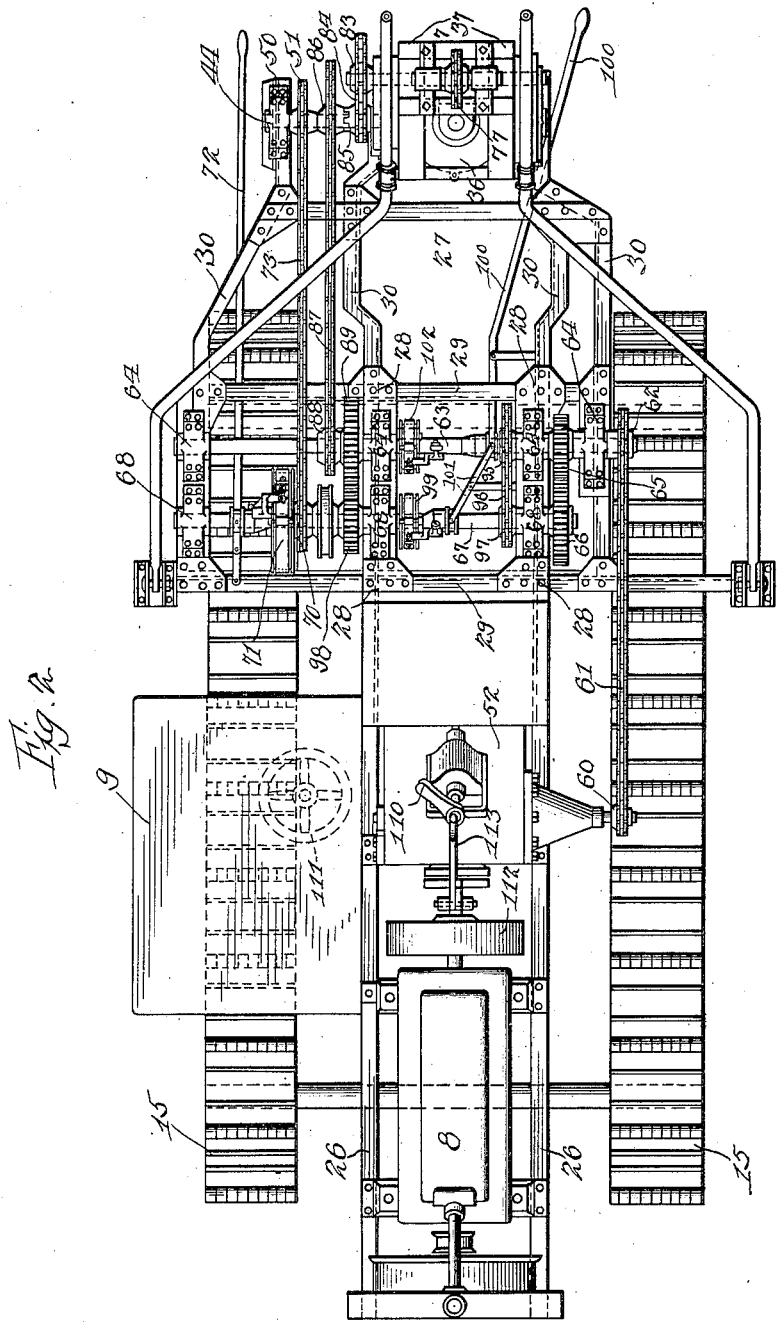

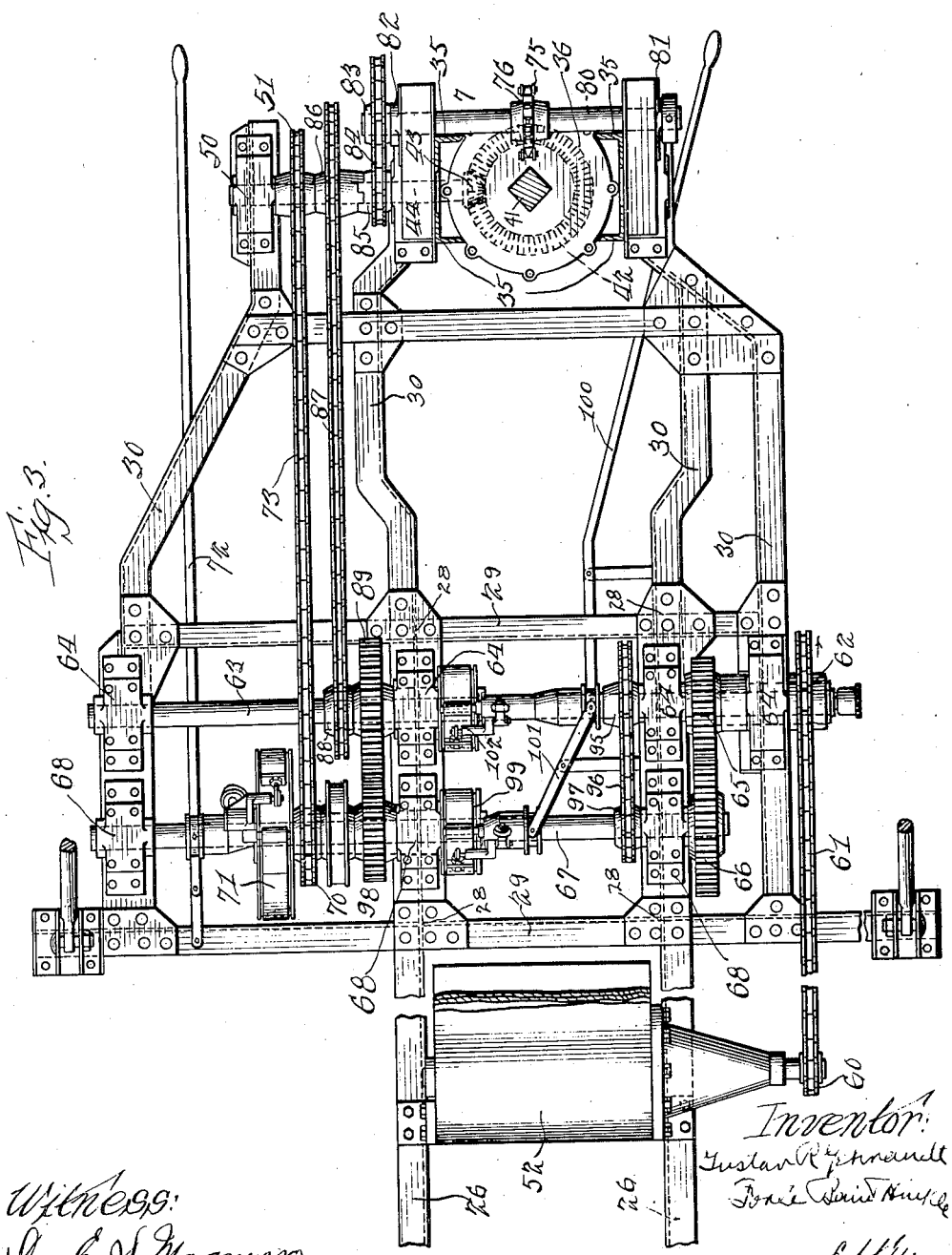

Patented Dec. 25, 1923.

1,478,824

UNITED STATES PATENT OFFICE.

GUSTAV R. GEHRANDT, OF EVANSTON, ILLINOIS, ASSIGNOR, BY MESNE ASSIGNMENTS, TO INTERNATIONAL EARTH-BORING MACHINE CORPORATION, A CORPORATION OF DELAWARE.

TRACTOR.

Application filed December 1, 1919. Serial No. 341,769.

*To all whom it may concern:*

Be it known that I, GUSTAV R. GEHRANDT, a citizen of Germany, residing at Evanston, in the county of Cook and State of Illinois, have invented certain new and useful Improvements in Tractors, of which the following is a specification.

This invention relates to tractors.

More particularly, it relates to tractor earth boring machines, drills, pile drivers, and the like.

Portable earth boring machines, pile drivers, etc., are ordinarily provided with a tower which carries the operating tool and is supported in a vertical or inclined position substantially above the place where a hole is to be made or a pile is to be driven.

With the usual vehicle, in order that the tower may be properly positioned, it has been the practice to pivotally mount the tower upon the vehicle so that the tower may be moved horizontally in a circle to accurately position the tool above the work and so that the tower may be swung to the side of the vehicle when the work is to be done in or in close proximity to an excavation. When the tower is thus swung to the side of the vehicle, it is often necessary to provide stays or outriggers to prevent the vehicle from being overturned by the weight and action of the tower and the tool carried thereby.

An object of the present invention is to provide a tractor, for this class of work, wherein a horizontally rotatable tower is unnecessary.

Another object is to provide a tractor on which the tower is relatively immovable in a horizontal plane.

Another object is to provide a tractor wherein the tower may be readily positioned above the work.

Another object is to provide a tractor whereby the work may be done in soft ground or in close proximity to excavations or in other difficult places.

Another object is to provide a tractor wherein a rigidly mounted tower is counterbalanced by the power plant.

Other objects and advantages of the invention will appear from the specification and claims.

An embodiment of the invention, particularly adapted for earth boring machines, is illustrated in the accompanying drawings, wherein—

Fig. 2 is a top plan thereof, and

Fig. 3 is an enlarged top plan of the forward end of the tractor with the tower shown in section.

Figure 1:
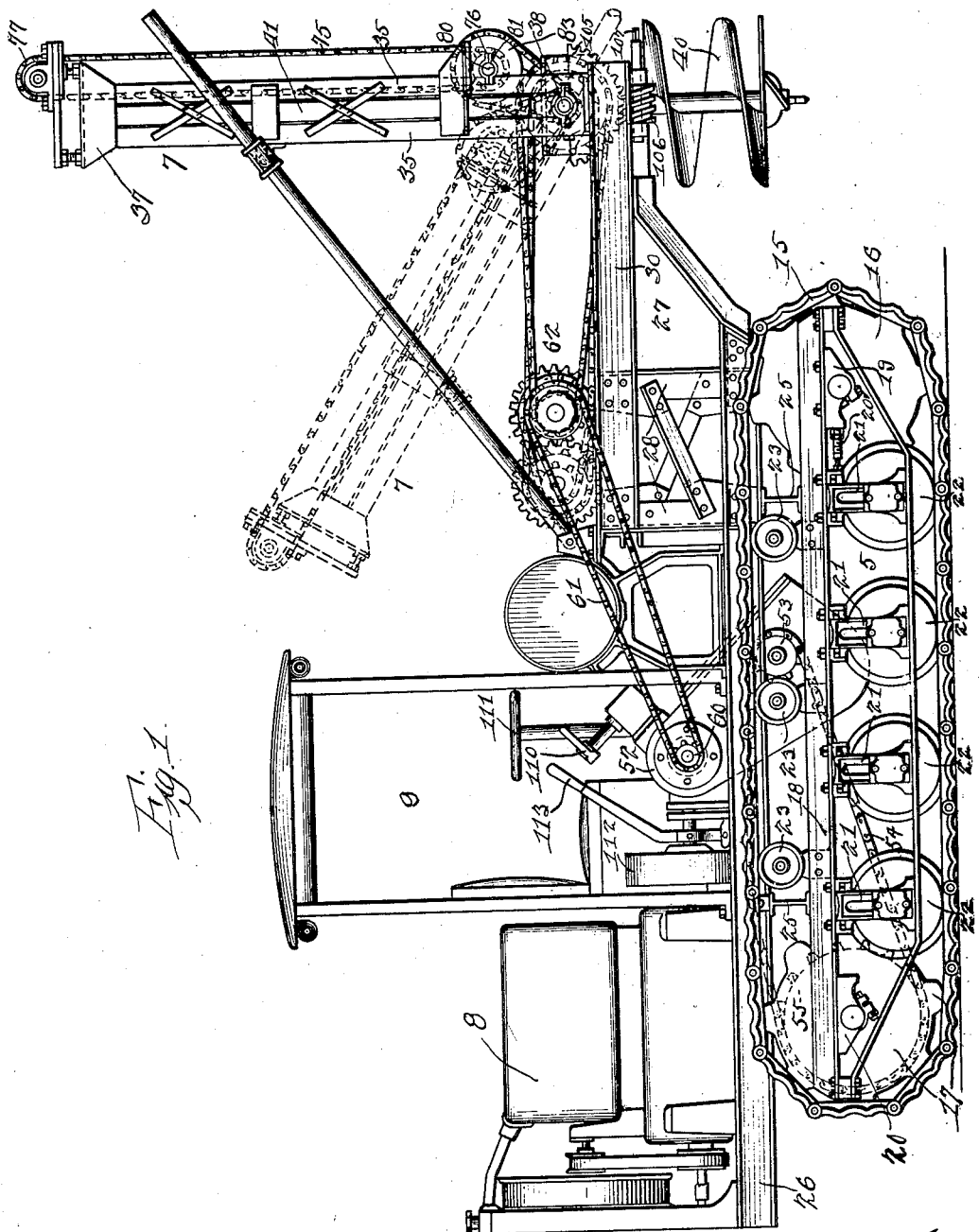
Fig. 1 is a side elevation of the tractor.

The tractor comprises a caterpillar tread and drive 5, carrying the vehicle frame at one end of which an auger tower 7 is rigidly supported and on the other end of which a driving motor 8, such as a gasoline engine, is mounted. Between the tower and the engine and at one side of the tractor, there is a cab 9 for the operator.

The caterpillar comprises a pair of closed chain treads or endless tracks 15, one on each side, upon and by means of which the vehicle is moved. Each tread passes over a pair of sprocket wheels 16 and 17, located respectively toward the front and rear of the vehicle. Sprocket wheels 16 and 17 are journaled to a bolster-frame 18 in pairs of bearings 19 and 20. Bearings 19 may be made longitudinally adjustable, by means of adjusting screws 20', to regulate the tension in the tread. Bolster frame 18 is provided with two series of bearings 21 carrying the axles of pairs of wheels 22 which communicate the load to the treads and press the lower sides of the treads to the road. The upper side of each tread passes over a number of supporting idler rollers 23 journaled in bearings carried by the upper side of the bolster-frame.

The tractor frame is supported upon the bolster-frame by a pair of cross I beams 25. The tractor frame comprises in general a pair of longitudinally extending channel bars 26, upon which is mounted at one end the engine 8 and at the other end a projecting tower support 27. The tower support is constructed of a steel net work of channel iron bars and plates, having four upright supporting posts 28 which are bolted to channels 26. Posts 28 carry cross beams 29 and longitudinal beams 30, which project beyond the caterpillar treads. Auger tower 7 is mounted upon the forward end of the tower support. The tower is formed of four upright angle posts 35, secured at their lower ends to the sides of an auger shaft gear-box 36. The tops of the posts are secured together by a suitable frame 37. Gear box 36 is provided with a pair of trunnions journaled in bearings 38 carried by the forward ends of beams 30 of the tower support so that the tower may be tilted or inclined in a substantially vertical plane to incline the tower for boring slanting holes, move the tower to a carrying position, etc. The carrying position of the tower is shown by the dotted lines of Fig. 1. The tower is horizontally substantially rigid relative to the caterpillar.

An auger 40 is secured to an auger shaft 41 which passes thru gear-box 36 and carries within the gear box a bevel gear wheel 42. Shaft 41 is adapted to slide thru gear wheel 42 but is rotated thereby. Gear wheel 42 is rotated by a pinion 43 keyed to the end of a shaft 44. Shaft 44 is journaled in a bearing 50 and gear-box 36 and is rotated by a sprocket wheel 51 keyed thereto.

Sprocket wheel 51 is driven, always in the same direction, to rotate the auger, by engine 8. Engine 8, thru suitable transmission mechanism located in a transmission housing 52 drives a pair of sprocket wheels 53, one on each side of the tractor, over which passes a pair of driving chains 54, which respectively engage sprocket wheels 55 associated with the drive wheel 17 of the respective treads 15. The engine thus serves to drive the tractor.

Thru the transmission mechanism the engine also drives a sprocket wheel 60 over which passes a sprocket chain 61. Chain 61 passes over a sprocket wheel 62 carried loosely on a shaft 63 journaled in bearings 64 mounted upon the tower support 27. Sprocket wheel 62 has rigidly secured thereto a gear wheel 65 meshing with a gear wheel 66. Gear wheel 66 is keyed to a shaft 67 journaled in bearings 68 mounted on tower frame 27. Shaft 67 carries loosely thereon a sprocket wheel 70 which may be connected and disconnected therefrom by a clutch 71. Clutch 71 is controlled by a lever 72. Between sprocket wheels 51 and 70 extends a chain 73. Thus, thru the transmission mechanism sprocket wheel 60, chain 61, sprocket wheel 62, gears 65 and 66, shaft 67, clutch 71, sprocket wheel 70, chain 73, sprocket wheel 51, shaft 44, and gears 43 and 42, the engine may rotate the auger. The rotation is always in the same direction and may be started and stopped at will by lever 72.

The engine also acts to raise and lower the auger. This is accomplished by suitably securing to the auger shaft an elevator having a hoisting and lowering chain 75. Chain 75 passes over a pair of sprocket wheels 76 and 77, mounted respectively near the bottom and top of the tower. Sprocket wheel 76 is keyed to a shaft 80 journaled in bearings 81 and 82, mounted on the auger tower. Shaft 80 has keyed thereto a sprocket wheel 83 over which passes a chain 84 to a sprocket wheel 85. Sprocket wheel 85 is loosely carried on shaft 44 and is connected to a sprocket wheel 86 also loosely mounted on shaft 44. A chain 87 passes over sprocket wheel 86 and a sprocket wheel 88 loosely mounted on shaft 63. Sprocket wheel 88 is rigidly secured to a gear wheel 89 which is also loose on shaft 63. Thus as gear wheel 89 is rotated in one or the other direction, chain 75 is correspondingly moved and the auger shaft and auger are raised or lowered. Since the auger shaft is loosely engaged by the opening in gear wheel 42 the auger may be raised and lowered while it is being rotated.

Gear wheel 89 is driven in either direction by the engine, in the following manner. Keyed to shaft 63 is a sprocket wheel 95, over which passes a chain 96, to a sprocket wheel 97 keyed to shaft 67. Loosely mounted on shaft 67 is a gear wheel 98 which meshes with gear wheel 89. Gear wheel 98 is connected to and disconnected from shaft 67 by a clutch 99 operated by a lever 100 thru a toggle 101. Gear wheel 89 may also be connected directly to shaft 63 by a clutch 102, which is also operated by lever 100. Clutches 99 and 102 are so related that when lever 100 is thrown to cause the gripping of one clutch, the other clutch is always thrown out of driving position. This prevents the stripping of the gears and injury to the clutches and other mechanism by inadvertently throwing the clutches so that the tendency would be to drive chain 87 in both directions simultaneously.

When lever 100 is operated to throw in clutch 99, clutch 102 is thrown out. The drive for the auger elevator is then thru sprocket wheel 60, chain 61, sprocket wheel 62, gear wheels 65 and 66, shaft 67, clutch 99, gear wheels 98 and 89, sprocket wheel 88 and chain 87. Sprocket wheel 88 is thus rotated in a direction opposite to the direction of rotation of shaft 67 and the auger shaft and auger may be raised. If clutch 102 is thrown in, clutch 99 is thrown out and the elevator is driven from sprocket wheel 60, chain 61, sprocket wheel 62, gear wheels 65 and 66, sprocket wheel 97, chain 96, sprocket wheel 95, shaft 63 and clutch 102, to sprocket wheel 88 and chain 87. Thus sprocket wheel 88 is driven in the same direction as shaft 67 and the auger shaft and auger is lowered.

To tilt the tower from its vertical position, gear box 36 is provided with a segmental gear 105, which engages a worm 106. Worm 106 is manually operable by a crank which may be applied to the squared end 107 of the worm shaft. By rotating the crank the tower may be inclined to any desired angle. The pitch of worm 106 and gear 105 is so related that the tower is locked against inadvertent or premature tilting. The tower can only be tilted by the operation of the crank.

The transmission, which may be of a well known type, may be controlled by a lever 110 so that when the tractor is being moved the auger operating mechanism may be stopped and vice versa. The transmission may also be arranged, if desired, so that boring and movement of the tractor may take place simultaneously. The tractor may be steered by a steering wheel 111, which, in a well known manner, may control clutches to apply power to only one tread or to both treads of the tractor, as desired. A clutch 112 controlled by a lever 113, acts to connect and disconnect the engine from the transmission.

The auger tower being rigidly secured to the tower support which in turn is rigidly secured to the tractor frame is soldily held in proper position relative to the work and the entire structure is rigid and strong. The caterpillar treads allow the tractor to be readily moved about to accurately position the tower and the tools carried thereby. With such a structure the tractor may be turned quickly and about a small radius, if necessary, practically about its center, so that no turn-table to position the tower is required. The tractor presents a large surface to the ground and is not readily overturned. The load is so distributed over the ground that the danger of cave-in and the difficulties of transportation over soft and uneven ground experienced with ordinary vehicles is largely, if not entirely overcome.

Having described my invention, what I claim is:—

1. A tractor having a caterpillar tread and drive, a frame rigidly carried by and projecting beyond said caterpillar and a tower carried by said frame and pivoted thereto on a horizontal axis.

2. A tractor having a caterpillar tread and drive, a frame rigidly carried by and projecting beyond said caterpillar, and a tiltable tower carried by said frame.

3. A tractor having a caterpillar tread and drive, a frame rigidly carried by and projecting beyond both ends of said caterpillar, a tower rigidly carried by said frame adjacent one end, and a source of power for driving said tractor and rigidly carried by said frame adjacent the opposite end thereof to balance the weight of said tower.

4. A tractor having a frame, a tower rigidly carried adjacent one end thereof, a source of power adjacent the other end of said frame to balance the weight of said tower, and a caterpillar tread and drive for supporting said frame and drive by said source of power.

5. A tractor having a caterpillar tread and drive, a frame, a tower rigidly supported by said frame adjacent one end thereof, a tool carried by said tower, and a motor carried by said frame adjacent the opposite end thereof and serving to drive said caterpillar and said tool.

In testimony whereof I hereunto subscribe my name.

GUSTAV R. GEHRANDT.